United States Patent Office 3,644,360
Patented Feb. 22, 1972

3,644,360
3-SUBSTITUTED METHYLQUINOXALINE-
2-CARBOXAMIDE-1,4-DIOXIDES
Marwan J. Abuel-Haj, Groton, Conn., assignor to
Pfizer Inc.
No Drawing. Filed May 5, 1970, Ser. No. 34,871
Int. Cl. C07d 51/78
U.S. Cl. 260—250          10 Claims

ABSTRACT OF THE DISCLOSURE

Novel 3-substituted quinoxaline - 2 - carboxamide-1,4-dioxides having the formula

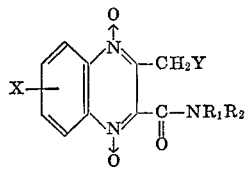

wherein

X is a 6- or 7-position substituent and is hydrogen, methyl, methoxy, bromo, chloro, fluoro and trifluoromethyl;
Y is lower alkylthio, lower alkyl sulfinyl and lower alkyl sulfonyl;
$R_1$ is hydrogen and lower alkyl; and
$R_2$ is hydrogen, lower alkyl and substituted lower alkyl wherein the substituent is
(a) amino, mono(lower alkyl)amino, di(lower alkyl)amino, pyrrolidino, piperidino, morpholino, N-(lower alkyl)piperazino, N-hydroxy(lower alkyl)piperazino, N-(lower alkanoyl)piperazino, N-carbo(lower alkoxy)-piperazino, pyrrolo, piperazino, imidazolidino,
(b) hydroxy, lower alkoxy, carboxy, carbo(lower)alkoxy, carbamyl, mono(lower alkyl)carbamyl, di(lower alkyl)carbamyl, lower alkanoyloxy, lower alkanoylamino; and
$R_1$ and $R_2$ when taken together with the nitrogen to which they are attached are pyrrolo, pyrrolidino, piperidino, morpholino, thiomorpholino, piperazino, N-(lower alkyl)piperazino, N-hydroxy(lower alkyl)piperazino, N-(lower alkanoyl)piperazino and N-carbo(lower alkoxy)piperazino;

and the pharmaceutically-acceptable acid addition salts of those compounds wherein $R_2$ is substituted lower alkyl wherein the substituent is selected from group (a); methods for their preparation; and their use as antibacterial agents and as agents for promoting growth and improving feed efficiency of animals.

BACKGROUND OF THE INVENTION

This invention relates to novel 3-substitutedquinoxaline-2 - carboamide - 1,4-dioxides and N-substituted-3-substitutedquinoxaline - 2-carboxamide-1,4-dioxides which are useful antibacterial agents for the control of various pathogenic micro-organisms and as animal growth promotants.

Numerous derivatives of quinoxaline-1,4-dioxides have been investigated as antibacterial agents. Landquist et al., J. Chem. Soc. 2052 (1956), in a search for compounds of improved antibacterial or antiprotozoal activity, reported the preparation of several derivatives of 2-methyl- and 2,3 - dimethylquinoxaline-1,4-dioxides in which the methyl groups were converted to groups such as bromomethyl-, acetoxymethyl- and hydroxymethyl. However, no utility is alleged for any of these compounds. French Pat. M3717, granted Jan. 3, 1966, generically discloses quinoxaline-2-carboxamide-1,4-dioxides in which the carboxamide group may be substituted with an alkyl, substituted alkyl, aryl, cycloalkyl, aralkyl or cycloalkylalkyl group; or may form a heterocyclic amide, e.g., a piperidide. They are reported to be of use in human therapy as antitubercular, antibacterial, anticancer, antivirus and antiprotozoal agents.

Belgian Pat. 697,976, granted Nov. 3, 1967, describes a variety of N-substituted derivatives of 3-methylquinoxaline-2-carboxamide1,4-dioxide in which the N-substituent is phenyl, substituted phenyl, dodecyl, or ethyl. Also disclosed are cyclic amides, e.g., pyrrolidine and piperidide. They are said to be of value as intermediates for the preparation of vegetation protection agents and pharmaceutical agents. Belgian Pats. 721,724; 721,725, 721,726; and 721,728; published Apr. 2, 1969, describe a variety of 3-methyl and 3 - (substitutedmethyl)quinoxaline-2-carboxamide-1,4-dioxide derivatives wherein the 3-substituent is a chloro, bromo, acyloxy, acylthio or isothiouronium group as antibacterial agents.

SUMMARY OF THE INVENTION

It has now been found that a series of 3-substituted-quinoxaline - 2 - carboxamide-1,4-dioxides are valuable antibacterial agents. The compounds have the formula

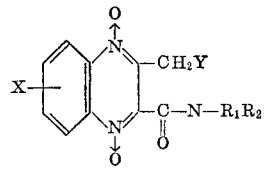

wherein:

X is a 6- or 7-position substituent and is selected from the group consisting of hydrogen, methyl, methoxy, chloro, fluoro, bromo and trifluoromethyl;
Y is selected from the group consisting of lower alkylthio, lower alkylsulfinyl and lower alkylsulfonyl;
$R_1$ is selected from the group consisting of hydrogen and lower alkyl;
$R_2$ is selected from the group consisting of hydrogen, lower alkyl and substituted lower alkyl wherein the substituent is selected from the group consisting of
(a) amino, mono(lower alkyl)amino, di(lower alkyl)amino, pyrrolidino, piperidino, morpholino, N-(lower alkyl)piperazino, N-hydroxy(lower alkyl)piperazino, N-(lower alkanoyl)piperazino, N - carbo(lower alkoxy)-piperazino, pyrrolo, piperazino, imidazolidino,
(b) hydroxy, lower alkoxy, carboxy, carbo(lower)alkoxy, carbamyl, mono(lower alkyl(carbamyl, di(lower alkyl) carbamyl, lower alkanoyloxy, lower alkanoylamino; and
$R_1$ and $R_2$ when taken together with the nitrogen to which they are attached are selected from the group consisting of pyrrolo, pyrrolidino, piperidino, morpholino, thiomorpholino, piperazino, N-(lower alkyl)piperazino, N-hydroxy(lower alkyl)piperazino, N-(lower alkanoyl)piperazino and N-carbo(lower alkoxy)piperazino;

and the pharmaceutically-acceptable acid addition salts of those compounds wherein $R_2$ is substituted lower alkyl wherein the substituent is selected from group (a).

By the terms lower alkyl, lower alkoxy, lower alkanoyloxy and lower alkanoyl is meant those alkyl, alkoxy, alkanoyloxy and alkanoyl groups containing from 1 to 4 carbon atoms since they are conveniently prepared from readily available starting materials.

The compounds of this invention are effective broad spectrum antibacterials in vitro. Such broad spectrum activity is in contrast to the gram-negative activity exhibited by currently available quinoxaline-1,4-dioxides. Additionally, as noted above, the herein described compounds are effective animal growth promotants, particularly for swine and poultry.

The substituents on the fused benzene moiety of the 3-substitutedquinoxaline-2-carboxamide-1,4-dioxide compounds can vary widely. For example, at least one of the following substituents can be present: hydrogen, lower alkyl, lower alkoxy, chloro, bromo, fluoro, trifluoromethyl, di(lower alkyl)amino, amino, carboxy, carbamyl, carbo (lower alkoxy), lower alkylmercapto, lower alkylsulfoxy, lower alkylsulfonyl, sulfonamido and N,N-di-(lower alkyl)sulfonamido. The favored positions on the fused benzene ring are the 6- and the 7-positions. Of special interest for these positions are at least one of the following substituents: hydrogen, methyl, chloro, fluoro and methoxy. A single substituent, that is, a 6- or a 7-substituent, is usually held in greater favor than is a 6,7-disubstituted derivative for reasons of economy as regards the reactants used. The preferred substituents, for reasons of economy and/or their favorable effect upon activity, are hydrogen, chloro and fluoro. Nitro, hydroxy and mercapto groups are not desirable substituents since they react with difficulty in the preferred process for making these novel compounds and/or formation of undesired products and poor yields.

Unique among the compounds of this invention by reason of their outstanding broad spectrum activity and significant growth promoting activity in animals, especially swine, are those compounds of Formula I wherein Y is lower alkylsulfonyl, X is hydrogen or chloro, and $R_1$ and $R_2$ are hydrogen or lower alkyl.

Additionally, analogous compounds in which one of the groups on the amide moiety is phenyl or substituted phenyl wherein the substituent is selected from the group consisting of lower alkyl, amino, mono- and di(lower alkyl) amino, carboxy, carbo(lower)alkoxy, hydroxy, carbamyl and trifluoromethyl, are also effective as antibacterial agents and animal growth promotants. Such compounds are prepared from the appropriate N-phenyl (or substituted phenyl) - 3 - methylquinoxaline-2-carboxamide-1,4-dioxide reactants in the same manner as are the products encompassed within the above formula.

The compounds of this invention wherein Y is lower alkylthio are prepared from the corresponding methyl compounds by a series of reactions comprising: (1) bromination (or chlorination) to produce the corresponding bromo(or chloro)methyl derivative; (2) conversion of the bromo(or chloro-)methyl derivative to the corresponding trimethylammonium methyl compound; and (3) replacement of the trimethylammonium group by a lower alkylthio group. The 3-lower alkylthiomethylquinoxaline-2-carboxamide-1,4-dioxide compounds are then oxidized to provide the corresponding 3-lower alkylsulfinyl- and 3-lower alkylsulfonyl compounds.

The 3 - methylquinoxaline-2-carboxamide-1,4-dioxide precursors are readily prepared according to the process of Belgian Pat. 721,724, published Apr. 2, 1969, and by other procedures described below. They are then converted to the bromo(or chloro)methyl derivative as described in Belgian Pat. 721,726, published Apr. 2, 1969.

DETAILED DESCRIPTION OF THE INVENTION

The 3-methylquinoxaline-2-carboxamide-1,4-dioxide reactants are conveniently prepared by reacting the appropriate benzofuroxan with the desired amino containing reactant, e.g., $HNR_1R_2$, wherein $R_1$ and $R_2$ are as defined above, and diketene (ketene dimer) in at least equimolar proportions. In this, the preferred process, an excess of the amine reactant is used since the reaction with the benzofuroxan is most readily conducted in the presence of a base catalyst. For the instant process, an excess of the amine reactant, which is frequently the most readily available and most economical of the reactants used, conveniently serves as catalyst. The amount of excess amine used is not critical. It is, however, advantageous to use up to a 50 percent molar excess of the amine based on the diketene or benzofuroxan used, in order to insure complete reaction plus sufficient base to serve as catalyst. The use of a larger excess of amine appears to serve no useful purpose. Alternatively, a separate base which does not enter into the reaction except to serve as catalyst, can be used in place of the amine reactant. The separate base can be a tertiary amine, ammonia, an alkali metal alkoxide, an alkali metal or alkaline earth metal hydroxide, or a metal hydride. Representative of such bases are 1,5-diazabicyclo[4,3,0]-5-nonene, triethylamine, 1,2-dimethyl-1,4,5,6-tetrahydropyrimidine, sodium methoxide, potassium ethoxide, alcoholic potassium hydroxide and sodium hydride. In such instances, as noted above, the amine reactant is used in approximately equimolar proportions to the diketene or benzofuroxan. The separate base is normally used up to one-half mole per mole of the diketene or benzofuroxan. Larger amounts of added base are of no apparent advantage. It can be added to the reaction mixture before, with or after the amine reactant, or with the benzofuroxan reactant.

The reaction is usually conducted in an appropriate solvent system, that is, a reaction-inert solvent or mixture of solvents, which serves to dissolve at least the reactants and which does not enter into adverse reactions with the reactants or products. Suitable solvents are ethers such as diethylether, diisopropylether, dioxane, tetrahydrofuran, dimethylethers of ethyleneglycol and diethyleneglycol; alcohols especially the lower molecular weight alcohols having up to four carbon atoms; N,N-dimethylformamide, benzene, toluene, xylene, acetonitrile, halogenated hydrocarbons such as chloroform, methylene chloride and mixtures of these solvents.

The reaction is normally conducted over the temperature range of from about 0° C. to about 100° C. Higher temperatures can be used but appear to offer no advantage and may in certain cases cause decomposition. The reaction period, as expected, depends upon the reactants and the temperature used. For a given set of reactants, the higher the reaction temperature, the shorter the reaction period; the lower the reaction temperature, the longer the reaction period.

The order of addition of reactants is not critical to the success of this process. The reaction can be conducted by simultaneous or stepwise addition of the various reactants including the excess amine or separate base as catalyst.

From a practical standpoint in order to achieve maximum yield of the desired 3-methylquinoxaline-2-carboxamide-1,4-dioxide, it is advantageous to react the diketene and amine containing reactant together in a suitable solvent system for a brief period before adding the benzofuroxan. A preferred method comprises adding a solution of the appropriate amine in a reaction-inert solvent to at least an equimolar solution of diketene in the same or other reaction-inert solvent which is miscible with the amine solvent at a temperature of from about 0° C. to about 30° C. The mixture is then treated immediately with the catalyst and benzofuroxan reactant by dissolving this last reactant into the amine-diketene reaction mixture. The temperature of this step of the reaction is not critical but can range up to about 100° C. In most instances, the temperature of this step is kept below about 60° C. and is frequently held about room temperature for periods of up to twenty-four hours. A convenient procedure involves allowing the reaction mixture to stand at room temperature for several hours, i.e., overnight.

In a related procedure, the appropriate benzofuroxan reactant is reacted with a preformed enamine of the β-ketoamide reactant, such as the morpholino or pyrrolidino derivative of acetoacetamide, according to the procedure of U.S. Pat. 3,398,141. A summary of the preparation of enamines is given by Szmuskovicz, "Advances in Organic Chemistry," 4, 1–113, Interscience Publishers, New York (1963). The enamine reactants are most conveniently prepared by reaction of a ketone with a secondary amine. Primary amines can also be used to produce enamines as those skilled in the art will appreciate.

The β-ketoamides which serve as reactants for the preformed enamine process are not readily available except by the reaction of diketene with the appropriate amine. In view of their limited availability and their preparation as intermediates in the preferred process described above, this process is of little interest from an economic standpoint.

Still another method involves the reaction of an ester of 3-methyl-2-quinoxalinecarboxylic acid-1,4-dioxide, i.e., the ethyl ester, with the appropriate amine reactant ($HNR_1R_2$) such as those indicated above, in a suitable solvent. The reaction is conducted by mixing the ester with the amine reactant in a solvent such as methanol at a temperature of from about 20° C. to about the reflux temperature of the solvent for a period of from about one hour to several days. The reaction period is, of course, dependent upon the temperature for a given system. The reactants are mixed preferably in a 1:1 molar ratio although excesses of either reactant can be used. The products are isolated as described herein.

A further method comprises acylation of the appropriate amine containing reactant using as acylating agent the product of a 3-methylquinoxaline-2-carboxylic acid-1,4-dioxide and a carbodiimide, such as 1,3-dicyclohexylcarbodiimide or N,N'-carbonyldiimidazole. The reaction is conducted at about ambient temperature by first reacting the acid reactant with the carbodiimide in a reaction-inert solvent such as the non-hydroxylic solvents enumerated above. The "activated" carboxylic acid is then reacted with the amine reactant and the product recovered by known methods. This procedure is not recommended for use with alkanolamines in order to avoid acylation at the hydroxy group of the alkanolamine.

The requisite 3-methylquinoxaline - 2 - carboxylic acid-1,4-dioxide and its esters are prepared as described by Landquist et al., J. Chem. Soc., 2052–58 (1956) or by reaction of the appropriate benzofuroxan with an ester of acetoacetic in the presence of a base as described by Issidorides et al., J. Org. Chem. 31, 4067–68 (1966). This latter method affords an ester of 3-methylquinoxaline-2-carboxylic acid-1,4-dioxide which is then hydrolyzed by known procedures to the acid.

The above-described methods which utilize a benzofuroxan as reactant produce both the 6- and 7-isomers of the compounds of this invention wherein X is other than hydrogen because of the existence of a dynamic, tautomeric equilibrium in the X-substituted benzofuroxan. The isomers, actually a mixture of isomers, are recovered by methods known to those skilled in the art. In many of the preparations disclosed herein a solid, often crystalline material, separates from the reaction mixture. The solid appears to consist predominantly of one of the isomers, which isomer can be purified by repeated recrystallization from a suitable solvent to a constant melting point. The other isomer, the one present in smaller amounts in the solid material, is the predominant product in the mother liquor. It can be recovered therefrom by methods known to those skilled in the art, as, for example, by evaporation of the mother liquor and repeated crystallization of the residue to a product of constant melting point. Alternatively, the reaction mixture can be extracted with a suitable solvent, either before or after evaporation to dryness, and the extracted material which contains both isomers purified further by recrystallization.

The identification of the isomers has not been completed. Both isomers of a given compound, however, exhibit the same type of activity, e.g., as animal growth promotants or as antibacterial agents, to a significant degree.

The 3-bromo(or chloro)methylquinoxaline-2-carboxamide-1,4-dioxide reactants are readily prepared by direct halogenation of the corresponding 3-methylquinoxaline-2-carboxamide-1,4-dioxide. Molecular bromine or chlorine are especially convenient agents to use. One procedure comprises mixing from one to two molar proportions of the 3-methylquinoxaline-2-carboxamide-1,4-dioxide and halogenating agent in chloroform or other chlorinated solvent such as methylene chloride, carbon tetrachloride and chlorobenzene. Additionally, solvents such as formic and acetic acids can also be used. The reaction is conducted over a temperature range of from about 20° C. to about 120° C. and desirably at from about 60° C. to about 100° C. for periods of from about one to about four hours.

The trimethylammonium derivatives are then prepared by treating the appropriate 3-bromo(or chloro)methylquinoxaline-2-carboxamide-1,4-dioxide with trimethylamine. The reaction is conducted in a suitable diluent, or solvent, such as N,N-dimethylformamide, ethanol, benzene, xylene, chloroform, dioxane or tetrahydrofuran at temperatures from about 20° C. to about 100° C., and preferably from about 20° C. to about 60° C. Trimethylamine is bubbled into a stirred mixture of the diluent and appropriate 3-bromo(or chloro)methylquinoxaline-2-carboxamide-1,4-dioxide until the mixture is saturated. The exothermic reaction is stirred for from about one-half to about four hours and the product recovered by filtration or evaporation of the diluent.

Replacement of the timethylammonium group by lower alkylthio is accomplished by reacting the appropriate lower alkyl mercaptan with aqueous sodium or potassium hydroxide. An organic solvent such as chloroform is then added followed by the {[3-(2-carboxamido)quinoxalinyl]methyl}trimethylammonium bromide(or chloride)-1,4-dioxide. The mixture is thoroughly stirred for from about one to four hours, the organic solvent phase separated and the 3-lower alkylthiomethylquinoxaline-2-carboxamide-1,4-dioxide recovered by removal of the solvent.

The 3-lower alkylthiomethylquinoxaline-2-carboxamide-1,4-dioxides, in addition to their use as antibacterial agents, are intermediates for the production of the corresponding 3-lower alkylsulfinylmethyl- and 3-lower alkylsulfonylmethylquinoxaline-2-carboxamide-1,4-dioxides by oxidation with hydrogen peroxide or an organic peracid such as peracetic, perphthalic, perbenzoic or m-chlorperbenzoic acid. This last-named peracid is especially useful since the by-product m-chlorobenzoic acid is easily removed. The reaction is conducted in a solvent such as chloroform or methylene chloride at from about 0° C. to about 30° C. until one or two equivalents (depending upon whether the sulfinyl or sulfonyl derivative is desired) of the oxidizing agent is consumed. It is advantageous when producing the sulfinyl derivatives to use equimolar proportions of reactants in order to avoid or minimize further oxidation. An excess (5 to 10 percent) of the oxidizing agent can be, and is generally, used when the sulfonyl derivative is the desired product.

Acid addition salts of the compounds described herein which contain a basic group are prepared by methods well-known to those skilled in the art. A convenient method comprises dissolving the free base in a suitable solvent, e.g., acetone, water, a lower aliphatic alcohol (ethanol, isopropanol) containing the desired acid, or to which the desired acid is subsequently added. The salts are recovered by filtration, precipitation with a non-solvent, by evaporation of the solvent or, in the case of aqueous solutions, by lyophilization. In this manner, the sulphate, nitrate, phosphate, acetate, propionate, butyrate, citrate, gluconate, benzoate, pamoate, amsonate, tartrate, 3-hydroxy-2-naphthoate and the sulphosalicylate and other salts can be prepared.

The products of this invention are remarkably effective in treating a wide variety of pathogenic micro-organisms and are, therefore, useful as industrial antimicrobials, for example, in water treatment, slime-control, paint preservation and wood preservation as well as for topical application purposes as disinfectants.

For in vitro use, e.g., for topical application, it will often be convenient to compound the selected product with a pharmaceutically-acceptable carrier such as vegetable or mineral oil or an emollient cream. Similarly, they may be dissolved or dispersed in liquid carriers or solvents, such as water, alcohol, glycols or mixtures thereof or other pharmaceutically-acceptable inert media, that is, media which have no harmful effect on the active ingredient. For such purposes, it will generally be acceptable to employ concentrations of active ingredients of from about 0.01 percent to about 10 percent by weight based on total composition.

The compounds described herein, in contrast to the usual gram-negative activity of quinoxaline-di-N-oxides, exhibit broad spectrum activity, that is, activity against both gram-negative and gram-positive bacteria, such as *Staphylococcus aureus, Streptomyces pyogenes, Escherichia coli, Pasteurella multocida* and *Shigella sonnei.*

When used in vivo for such purposes, these novel compounds can be administered orally or parenterally, e.g., by cutaneous or intramuscular injection, at a dosage of from about 1 mg./kg. to about 100 mg./kg. of body weight. Vehicles suitable for parenteral injection may be either aqueous such as water, isotonic saline, isotonic dextrose, Ringer's solution, or nonaqueous such as fatty oils of vegetable origin (cotton seed, peanut oil, corn, sesame), dimethylsulfoxide and other non-aqueous vehicles which will not interfere with therapeutic efficiency of the preparation and are non-toxic in the volume or proportion used (glycerol, propylene glycol, sorbitol). Additionally, compositions suitable for extemporaneous preparation of solutions prior to administration may advantageously be made. Such compositions may include liquid diluents, for example, propylene glycol, diethyl carbonate, glycerol, sorbitol, etc.; buffering agents, hyaluronidase, local anesthetics and inorganic salts to afford desirable pharmacological properties. These compounds may also be combined with various pharmaceutically-acceptable inert carriers including solid diluents, aqueous vehicles, non-toxic organic solvents in the form of capsules, tablets, lozenges, troches, dry mixes, suspensions, solutions, elixirs and parenteral solutions or suspensions. In general, the compounds are used in various dosage forms at concentration levels ranging from about 0.5 percent to about 90 percent by weight of the total composition. Other methods include mixing with animal feeds, the preparation of feed concentrates and supplements and dilute solutions or suspensions, e.g., a 0.1 percent solution, for drinking purposes.

The addition of a low level of one or more of the herein described 3 - substituted quinoxaline - 2 - carboxamide-1,4-dioxides to the diet of healthy animals, both ruminant and non-ruminant, such that these animals receive the product over an extended period of time, at a level of from about 1 mg./kg. to about 100 mg./kg. of body weight per day, especially over a major portion of their active growth period, results in an acceleration of the rate of growth and improves feed efficiency (the number of pounds of feed required to produce a pound gain in weight). Included in these two classes of animals are poultry (chickens, ducks, turkeys), cattle, sheep, dogs, cats, swine, rats, mice, horses, goats, mules, rabbits, mink, etc. The beneficial effects in growth rate and feed efficiency are over and above what is normally obtained with complete nutritious diets containing all the nutrients, vitamins, minerals, and other factors known to be required for the maximum healthy growth of such animals. The animals thus attain market size sooner and on less feed.

The feed compositions described herein have been found to be particularly valuable and outstanding in the case of swine. In some instances the degree of response may vary with respect to the sex of the animals. The products may, of course, be administered in one component of the feed or they may be blended uniformly throughout a mixed feed; alternatively as noted above, they may be administered in an equivalent amount via the animal's water ration. It should be noted that a variety of feed components may be of use in the nutritionally balanced feeds. Any animal feed composition may be prepared to comprise the usual nutritional balance of energy, proteins, minerals and vitamins together with one or more of the quinoxaline-di-N-oxides described above. Some of the various components are commonly grains such as ground grain and grain by-products; animal protein substances, such as meat and fish by-products; vitaminaceous mixtures, e.g., vitamin A and D mixtures, riboflavin supplements and other vitamin B complexes; and bone meal, limestone and other inorganic compounds to provide minerals.

The relative proportions of the present compounds in feeds and feed concentrates may vary somewhat, depending upon the compound, the feed with which they are employed and the animal consuming the same. These substances are advantageously combined in such relative proportions with edible carriers as to provide pre-mixes or concentrates which may readily be blended with standard nutritionally balanced feeds or which may be used themselves as an adjunct to normal feedings.

In the preparation of concentrates a wide variety of carriers such as soybean oil meal, corn gluten meal, cotton seed oil meal, sunflower seed meal, linseed oil meal, cornmeal, limestone and corncob meal can be employed to facilitate uniform distribution of the active materials in the finished feed with which the concentrate is blended. The concentrate may be surface coated, if desired, with various proteinaceous materials of edible waxes, such as zein, gelatin, microcrystalline wax and the like to provide a protective film which seals in the active ingredients. The proportions of the drug preparation in such concentrates are capable of wide variation since the amount of active materials in the finished feed may be adjusted by blending the appropriate proportion of concentrate with the feed to obtain the desired degree of supplementation. In the preparation of high potency concentrates, i.e., premixes, suitable for blending by feed manufacturers to produce finished feeds or concentrates of lower potency, the drug content may range from about 0.1 g. to 50 g. per pound of concentrate. The high potency concentrates may be blended by the feed manufacturer with proteinaceous carriers, such as soybean oil meal, to produce concentrated supplements which are suitable for direct feeding to animals. The proportion of the drug in these supplements may vary from about 0.1 to 10 g. per pound of supplement. A particularly useful concentrate is provided by blending 2 g. of drug with 1 pound of limestone or 1 pound of limestone-soybean oil meat (1:1). Other dietary supplements, such as vitamins, minerals, etc., may be added to the concentrates in the appropriate circumstances.

The concentrates described may also be added to animal feeds to produce a nutritionally balanced, finished feed containing from about 5 to about 125 g. of the herein described compounds per ton of finished feed. In the case of ruminants, the finished feed should contain protein, fat, fiber, carbohydrate, vitamins and minerals, each in an amount sufficient to meet the nutritional requirements of the animal for which the feed is intended. Most of these substances are present in naturally occurring feed materials, such as alfalfa hay or meal, cracked corn, whole oats, soybean oil meal, corn silage, ground corn cobs, wheat bran and dried molasses. Bone meal, limestone, iodized salt and trace minerals are frequently added to supply the necessary minerals and urea to provide additional nitrogen.

As is well-known to those skilled in the art, the types of diets are extremely variable depending upon the purpose, type of feeding operation, species, etc. Specific diets for various purposes are listed by Morrison in the Appendix of "Feeds and Feeding," the Morrison Publishing Company, Clinton, Iowa, 1959. In the case of non-ruminant animals, such as hogs, a suitable feed may contain from about 50 to 80 percent of grains, 3 to 10 percent animal protein, 5 to 30 percent vegetable protein, 2 to 4 percent of minerals, together with supplementary vitaminaceous sources.

The following examples are given solely for the purpose of illustration.

EXAMPLE I 3-methylthiomethylquinoxaline-2-carboxamide-1,4-dioxide

A mixture of 3-bromomethylquinoxaline-2-carboxamide-1,4-dioxide (2.64 g.) and N,N-dimethylformamide (15 ml.) is stirred at room temperature and trimethylamine gas bubbled in for one-half hour. A clear solution is formed within five minutes after introducing the trimethylamine. Aqueous potassium hydroxide (15 ml. of 1 N) is added then excess methylmercaptan bubbled through the solution for twenty minutes. The voluminous precipitate which forms is extracted with chloroform and the aqueous reaction mixture again saturated with methylmercaptan then extracted with chloroform. The chloroform extracts are concentrated in vacuo, hot hexane (50 ml.) added to precipitate the product which is recovered by filtration (0.59 g.). M.P. 200.5°–201° C. Additional product (0.16 g.) is recovered by stripping the mother liquors to give an oil which solidifies upon standing. This crude second crop is purified by trituration with benzene.

Repetition of the above procedure but using the appropriate reactants in place of methylmercaptan or 3-bromomethylquinoxaline-2-carboxamide produces the following compounds:

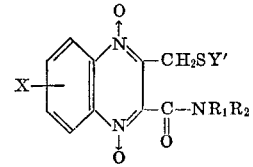

| X | Y' | $R_1$ | $R_2$ | M.P. (° C.) | Rx. solvent |
|---|----|----|----|----|----|
| H | $C_2H_5$ | H | H | 201–202 | $CHCl_3$-ether. |
| H | $CH_3$ | H | $CH_3$ | 197 (dec.) | Acetone-$CHCl_3$. |
| H | $C_2H_5$ | H | $CH_3$ | 201–202 | $CHCl_3$-hexane. |

EXAMPLE II

The procedure of Example I is repeated but using the appropriate 3-bromomethylquinoxaline-2-carboxamide-1,4-dioxides and lower alkyl mercaptans to produce compounds having the formula:

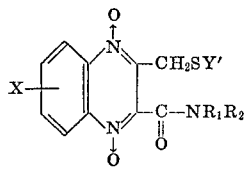

| X | Y' | $R_1$ | $R_2$ |
|---|----|----|----|
| Cl | $CH_3$ | H | H |
| Br | $CH_3$ | H | H |
| F | $CH_3$ | H | H |
| $CH_3$ | $CH_3$ | H | H |
| $OCH_3$ | $CH_3$ | H | H |
| $CF_3$ | $CH_3$ | H | H |
| Cl | $CH_3$ | H | $CH_3$ |
| F | $CH_3$ | H | $CH_3$ |
| $CH_3$ | $CH_3$ | H | $CH_3$ |
| $OCH_3$ | $CH_3$ | H | $CH_3$ |
| $CF_3$ | $CH_3$ | H | $CH_3$ |
| H | $CH_3$ | H | $C_2H_5$ |
| Cl | $CH_3$ | H | $C_2H_5$ |
| F | $CH_3$ | H | $C_2H_5$ |
| $OCH_3$ | $CH_3$ | H | $C_2H_5$ |
| H | $CH_3$ | H | $n-C_3H_7$ |
| Cl | $CH_3$ | H | $n-C_3H_7$ |
| H | $CH_3$ | H | $n-C_4H_9$ |
| Cl | $CH_3$ | H | $n-C_4H_9$ |
| F | $CH_3$ | H | $n-C_4H_9$ |
| $CF_3$ | $CH_3$ | H | $n-C_4H_9$ |
| H | $CH_3$ | H | $t-C_4H_9$ |
| $OCH_3$ | $CH_3$ | H | $t-C_4H_9$ |
| Cl | $C_2H_5$ | H | H |
| F | $C_2H_5$ | H | H |
| H | $n-C_3H_7$ | H | H |
| Cl | $n-C_3H_7$ | H | H |
| H | $n-C_4H_9$ | H | $n-C_4H_9$ |
| Cl | $n-C_4H_9$ | H | $n-C_4H_9$ |
| H | $n-C_4H_9$ | H | $sec-C_4H_9$ |
| H | $CH_3$ | $CH_3$ | $CH_3$ |
| Cl | $CH_3$ | $CH_3$ | $CH_3$ |
| F | $CH_3$ | $CH_3$ | $CH_3$ |
| $OCH_3$ | $CH_3$ | $CH_3$ | $CH_3$ |
| Br | $CH_3$ | $CH_3$ | $CH_3$ |
| $CF_3$ | $CH_3$ | $CH_3$ | $CH_3$ |
| H | $CH_3$ | $C_2H_5$ | $C_2H_5$ |
| H | $CH_3$ | $n-C_4H_9$ | $n-C_4H_9$ |
| F | $CH_3$ | $n-C_4H_9$ | $n-C_4H_9$ |
| $CH_3$ | $CH_3$ | $n-C_4H_9$ | $n-C_4H_9$ |
| $OCH_3$ | $CH_3$ | $n-C_4H_9$ | $n-C_4H_9$ |
| H | $CH_3$ | $n-C_4H_9$ | $CH_3$ |
| Cl | $CH_3$ | $n-C_4H_9$ | $CH_3$ |
| H | $CH_3$ | —$CH_2CH_2CH_2CH_2$— | |
| Cl | $CH_3$ | —$CH_2CH_2CH_2CH_2$— | |
| F | $CH_3$ | —$CH_2CH_2CH_2CH_2$— | |
| $OCH_3$ | $CH_3$ | —$CH_2CH_2CH_2CH_2$— | |
| $CF_3$ | $CH_3$ | —$CH_2CH_2CH_2CH_2$— | |
| H | $C_2H_5$ | —$CH_2CH_2CH_2CH_2$— | |
| Cl | $C_2H_5$ | —$CH_2CH_2CH_2CH_2$— | |
| H | $i-C_3H_7$ | —$CH_2CH_2CH_2CH_2$— | |
| F | $i-C_3H_7$ | —$CH_2CH_2CH_2CH_2$— | |
| H | $n-C_4H_9$ | —$CH_2CH_2CH_2CH_2$— | |
| Cl | $n-C_4H_9$ | —$CH_2CH_2CH_2CH_2$— | |
| $OCH_3$ | $n-C_4H_9$ | —$CH_2CH_2CH_2CH_2$— | |
| Br | $n-C_4H_9$ | —$CH_2CH_2CH_2CH_2$— | |
| H | $t-C_4H_9$ | —$CH_2CH_2CH_2CH_2$— | |

| X | Y' | R | $R_2$ |
|---|----|----|----|
| Br | $n-C_3H_7$ | H | H |
| $OCH_3$ | $n-C_3H_7$ | H | H |
| $CH_3$ | $n-C_3H_7$ | H | H |
| H | $i-C_3H_7$ | H | H |
| H | $n-C_4H_9$ | H | H |
| Cl | $n-C_4H_9$ | H | H |
| $OCH_3$ | $n-C_4H_9$ | H | H |
| $CF_3$ | $n-C_4H_9$ | H | H |
| $CH_3$ | $n-C_4H_9$ | H | H |
| Cl | $C_2H_5$ | H | $CH_3$ |
| F | $C_2H_5$ | H | $CH_3$ |
| $CH_3$ | $C_2H_5$ | H | $CH_3$ |
| H | $n-C_3H_7$ | H | $CH_3$ |
| Br | $n-C_3H_7$ | H | $CH_3$ |
| H | $t-C_4H_9$ | H | $CH_3$ |
| Cl | $t-C_4H_9$ | H | $CH_3$ |
| F | $t-C_4H_9$ | H | $CH_3$ |
| $CH_3$ | $t-C_4H_9$ | H | $CH_3$ |
| H | $C_2H_5$ | H | $C_2H_5$ |
| Cl | $C_2H_5$ | H | $C_2H_5$ |
| H | $n-C_3H_7$ | H | $n-C_3H_7$ |
| F | $n-C_3H_7$ | H | $n-C_3H_7$ |
| H | $n-C_4H_9$ | H | $C_2H_5$ |
| Cl | $n-C_4H_9$ | H | $C_2H_5$ |
| $OCH_3$ | $n-C_4H_9$ | H | $C_2H_5$ |
| Cl | $t-C_4H_9$ | H | $C_2H_5$ |
| $CF_3$ | $t-C_4H_9$ | H | $C_2H_5$ |
| Cl | $n-C_4H_9$ | —$CH_2CH_2CH_2CH_2CH_2$— | |
| $OCH_3$ | $n-C_4H_9$ | —$CH_2CH_2CH_2CH_2CH_2$— | |
| Br | $n-C_4H_9$ | —$CH_2CH_2CH_2CH_2CH_2$— | |
| H | $CH_3$ | —$CH_2CH_2$—NH—$CH_2CH_2$— | |
| F | $CH_3$ | —$CH_2CH_2$—NH—$CH_2CH_2$— | |
| $OCH_3$ | $CH_3$ | —$CH_2CH_2$—NH—$CH_2CH_2$— | |
| $CF_3$ | $CH_3$ | —$CH_2CH_2$—NH—$CH_2CH_2$— | |
| Cl | $CH_3$ | —$CH_2CH_2$—NH—$CH_2CH_2$— | |
| H | $n-C_3H_7$ | —$CH_2CH_2$—NH—$CH_2CH_2$— | |
| Cl | $n-C_3H_7$ | —$CH_2CH_2$—NH—$CH_2CH_2$— | |
| Br | $n-C_3H_7$ | —$CH_2CH_2$—NH—$CH_2CH_2$— | |
| H | $sec-C_4H_9$ | —$CH_2CH_2$—NH—$CH_2CH_2$— | |
| F | $sec-C_4H_9$ | —$CH_2CH_2$—NH—$CH_2CH_2$— | |
| H | $CH_3$ | —CH=CH—CH=CH— | |
| Cl | $CH_3$ | —CH=CH—CH=CH— | |
| F | $CH_3$ | —CH=CH—CH=CH— | |
| $OCH_3$ | $CH_3$ | —CH=CH—CH=CH— | |
| H | $n-C_4H_9$ | —CH=CH—CH=CH— | |
| Br | $n-C_4H_9$ | —CH=CH—CH=CH— | |
| $CH_3$ | $n-C_4H_9$ | —CH=CH—CH=CH— | |
| $CF_3$ | $n-C_4H_9$ | —CH=CH—CH=CH— | |
| H | $CH_3$ | —$CH_2CH_2$—O—$CH_2CH_2$— | |
| Cl | $CH_3$ | —$CH_2CH_2$—O—$CH_2CH_2$— | |
| F | $CH_3$ | —$CH_2CH_2$—O—$CH_2CH_2$— | |
| $CH_3$ | $CH_3$ | —$CH_2CH_2$—O—$CH_2CH_2$— | |
| $OCH_3$ | $CH_3$ | —$CH_2CH_2$—O—$CH_2CH_2$— | |
| $CF_3$ | $CH_3$ | —$CH_2CH_2$—O—$CH_2CH_2$— | |
| H | $C_2H_5$ | —$CH_2CH_2$—O—$CH_2CH_2$— | |
| Br | $C_2H_5$ | —$CH_2CH_2$—O—$CH_2CH_2$— | |

| X | Y' | R₁ | R₂ |
|---|---|---|---|
| H | CH₃ | | —CH₂CH₂CH₂CH₂CH₂— |
| Cl | CH₃ | | —CH₂CH₂CH₂CH₂CH₂— |
| F | CH₃ | | —CH₂CH₂CH₂CH₂CH₂— |
| CH₃ | CH₃ | | —CH₂CH₂CH₂CH₂CH₂— |
| OCH₃ | CH₃ | | —CH₂CH₂CH₂CH₂CH₂— |
| H | C₂H₅ | | —CH₂CH₂CH₂CH₂CH₂— |
| F | C₂H₅ | | —CH₂CH₂CH₂CH₂CH₂— |
| H | n-C₄H₉ | | —CH₂CH₂CH₂CH₂CH₂— |
| H | CH₃ | | —CH₂CH₂—S—CH₂CH₂— |
| Cl | CH₃ | | —CH₂CH₂—S—CH₂CH₂— |
| F | CH₃ | | —CH₂CH₂—S—CH₂CH₂— |
| OCH₃ | CH₃ | | —CH₂CH₂—S—CH₂CH₂— |
| H | n-C₄H₉ | | —CH₂CH₂—S—CH₂CH₂— |
| Cl | n-C₄H₉ | | —CH₂CH₂—S—CH₂CH₂— |
| Br | n-C₄H₉ | | —CH₂CH₂—S—CH₂CH₂— |
| CH₃ | n-C₄H₉ | | —CH₂CH₂—S—CH₂CH₂— |
| H | CH₃ | | —CH₂CH₂N(CH₃)CH₂CH₂— |
| Cl | CH₃ | | —CH₂CH₂N(CH₃)CH₂CH₂— |
| F | CH₃ | | —CH₂CH₂N(CH₃)CH₂CH₂— |
| CF₃ | CH₃ | | —CH₂CH₂N(CH₃)CH₂CH₂— |
| H | n-C₃H₇ | | —CH₂CH₂N(C₂H₅)CH₂CH₂— |
| OCH₃ | n-C₃H₇ | | —CH₂CH₂N(C₂H₅)CH₂CH₂— |
| H | n-C₄H₉ | | —CH₂CH₂N(n-C₄H₉)CH₂CH₂— |
| Br | n-C₄H₉ | | —CH₂CH₂N(n-C₄H₉)CH₂CH₂— |
| CH₃ | n-C₄H₉ | | —CH₂CH₂N(n-C₄H₉)CH₂CH₂— |
| H | CH₃ | | —CH₂CH₂—N(CH₂CH₂OH)—CH₂CH₂— |
| Cl | CH₃ | | —CH₂CH₂—N(CH₂CH₂OH)—CH₂CH₂— |
| F | CH₃ | | —CH₂CH₂—N(CH₂CH₂OH)—CH₂CH₂— |
| CH₃ | CH₃ | | —CH₂CH₂—N(CH₂CH₂OH)—CH₂CH₂— |
| H | i-C₃H₇ | | —CH₂CH₂—N((CH₂)₄OH)—CH₂CH₂— |
| Cl | i-C₃H₇ | | —CH₂CH₂—N((CH₂)₄OH)—CH₂CH₂— |
| CF₃ | i-C₃H₇ | | —CH₂CH₂—N((CH₂)₄OH)—CH₂CH₂— |
| OCH₃ | i-C₃H₇ | | —CH₂CH₂—N((CH₂)₄OH)—CH₂CH₂— |
| H | CH₃ | | —CH₂CH₂N(CHO)CH₂CH₂— |
| Cl | CH₃ | | —CH₂CH₂N(CHO)CH₂CH₂— |
| F | CH₃ | | —CH₂CH₂N(CHO)CH₂CH₂— |
| H | CH₃ | | —CH₂CH₂N(COCH₃)CH₂CH₂— |
| CH₃ | CH₃ | | —CH₂CH₂N(COCH₃)CH₂CH₂— |
| Br | C₂H₅ | C₂H₅ | CH₂CH₂OH |
| OCH₃ | C₂H₅ | C₂H₅ | CH₂CH₂OH |
| H | CH₃ | n-C₄H₉ | CH₂CH₂OH |
| CH₃ | CH₃ | n-C₄H₉ | CH₂CH₂OH |
| H | CH₃ | H | CH₂CH₂N(CH₃)₂ |
| Cl | i-C₃H₇ | H | CH₂CH₂N(CH₃)₂ |
| CH₃ | C₂H₅ | H | CH₂CH₂N(CH₃)₂ |
| F | CH₃ | H | CH₂CH₂CH₂N(CH₃)₂ |
| Cl | C₂H₅ | H | CH₂CH₂NH₂ |
| OCH₃ | C₂H₅ | H | CH₂CH₂NH₂ |
| Cl | CH₃ | H | CH₂CH₂N(n-C₄H₉)₂ |
| OCH₃ | CH₃ | CH₃ | CH₂CH₂NHCH₃ |
| Cl | CH₃ | H | CH₂CH₂NHCH₃ |
| H | CH₃ | CH₃ | CH₂CH₂NHCH₃ |
| H | CH₃ | H | CH₂CH₂-pyrrolo |
| H | C₂H₅ | H | CH₂CH₂CH₂-morpholino |
| H | CH₃ | H | CH₂CH₂-pyrrolidino |
| Cl | CH₃ | H | CH₂CH₂-morpholino |
| F | CH₃ | H | CH₂CH₂-morpholino |
| F | C₂H₅ | H | CH₂CH₂-piperidino |
| H | CH₃ | H | CH₂CH₂CH₂-piperidino |
| Cl | t-C₄H₉ | H | CH₂CH₂CH₂-piperidino |
| H | CH₃ | H | CH₂CH₂-(N-methylpiperazino) |
| Cl | CH₃ | H | CH₂CH₂CH₂-(N-methyl-piperazino) |

| X | Y' | R₁ | R₂ |
|---|---|---|---|
| Cl | CH₃ | | —CH₂CH₂N(COCH₃)CH₂CH₂— |
| H | n-C₃H₇ | | —CH₂CH₂N(COC₃H₇)CH₂CH₂— |
| F | n-C₃H₇ | | —CH₂CH₂N(COC₃H₇)CH₂CH₂— |
| OCH₃ | n-C₃H₇ | | —CH₂CH₂N(COC₃H₇)CH₂CH₂— |
| H | CH₃ | | —CH₂CH₂N(COOCH₃)CH₂CH₂— |
| Cl | CH₃ | | —CH₂CH₂N(COOCH₃)CH₂CH₂— |
| F | CH₃ | | —CH₂CH₂N(COOCH₃)CH₂CH₂— |
| OCH₃ | CH₃ | | —CH₂CH₂N(COOCH₃)CH₂CH₂— |
| H | CH₃ | | —CH₂CH₂—N(COO-n-C₄H₉)—CH₂CH₂— |
| H | C₂H₅ | | —CH₂CH₂—N(COO-n-C₄H₉)—CH₂CH₂— |
| Cl | C₂H₅ | | —CH₂CH₂—N(COO-n-C₄H₉)—CH₂CH₂— |
| F | C₂H₅ | | —CH₂CH₂—N(COO-n-C₄H₉)—CH₂CH₂— |
| CH₃ | C₂H₅ | | —CH₂CH₂—N(COO-n-C₄H₉)—CH₂CH₂— |
| H | n-C₄H₉ | | —CH₂CH₂—N(COOCH₃)—CH₂CH₂— |
| Br | n-C₄H₉ | | —CH₂CH₂—N(COOCH₃)—CH₂CH₂— |
| H | CH₃ | H | CH₂CH₂OH |
| Cl | CH₃ | H | CH₂CH₂OH |
| F | CH₃ | CH₃ | CH₂CH₂OH |
| H | n-C₄H₉ | H | CH₂CH₂OH |
| H | CH₃ | H | CH₂CH(CH₃)OH |
| H | CH₃ | H | CH₂CH₂CH₂OH |
| H | C₂H₅ | H | C(CH₃)₂CH₂OH |
| Cl | CH₃ | H | C(CH₃)₂CH₂OH |
| H | CH₃ | H | (CH₂)₄OH |
| F | CH₃ | H | (CH₂)₄OH |
| CH₃ | CH₃ | H | (CH₂)₄OH |
| CF₃ | CH₃ | H | (CH₂)₄OH |
| H | C₃H₇ | H | (CH₂)₄OH |
| H | C₂H₅ | C₂H₅ | CH₂CH₂OH |
| Cl | C₂H₅ | C₂H₅ | CH₂CH₂OH |
| OCH₃ | C₂H₅ | C₂H₅ | CH₂CH₂OH |
| H | CH₃ | CH₃ | CH₂CH₂OH |
| Cl | CH₃ | n-C₄H₉ | CH₂CH₂OH |
| OCH₃ | CH₃ | n-C₄H₉ | CH₂CH₂OH |
| Cl | CH₃ | H | CH₂CH₂N(CH₃)₂ |
| F | C₂H₅ | H | CH₂CH₂N(CH₃)₂ |
| H | CH₃ | H | CH₂CH₂CH₂N(CH₃)₂ |
| H | C₂H₅ | H | CH₂CH₂NH₂ |
| F | C₂H₅ | H | CH₂CH₂NH₂ |
| H | CH₃ | H | CH₂CH₂N(n-C₄H₉)₂ |
| F | CH₃ | CH₃ | CH₂CH₂NHCH₃ |
| H | n-C₃H₇ | C₂H₅ | CH₂CH₂NHCH₃ |
| OCH₃ | C₂H₅ | H | CH₂CH₂NHCH₃ |
| F | C₂H₅ | H | CH₂CH₂NH(C₂H₅) |
| H | i-C₃H₇ | H | CH₂CH₂-pyrrolo |

| X | Y' | R₁ | R₂ | X | Y' | R₁ | R₂ |
|---|---|---|---|---|---|---|---|
| OCH₃ | CH₃ | H | CH₂CH₂-morpholino | | | | |
| CH₃ | CH₃ | H | CH₂CH₂-morpholino | | | | |
| H | CH₃ | H | CH₂CH₂-(N-formylpiperazino) | | | | |
| H | CH₃ | H | CH₂CH₂-(N-acetylpiperazino) | | | | |
| F | n-C₃H₇ | H | CH₂CH₂-(N-carbobutoxy-piperazino) | | | | |
| H | CH₃ | CH₃ | CH₂CH₂-(N-hydroxyethyl-piperazino) | | | | |
| Cl | CH₃ | CH₃ | CH₂CH₂-(N-hydroxyethyl-piperazino) | | | | |
| CH₃ | CH₃ | CH₃ | CH₂CH₂-(N-hydroxyethyl-piperazino) | | | | |
| Br | CH₃ | CH₃ | CH₂CH₂-(N-hydroxyethyl-piperazino) | | | | |
| CF₃ | C₂H₅ | H | CH₂CH₂-(N-hydroxyethyl-piperazino) | | | | |
| OCH₃ | CH₃ | H | CH₂CH₂CH₂-(N-carbomethoxypiperazino) | | | | |
| H | CH₃ | C₂H₅ | CH₂CH₂CH₂CH₂-(N-3-hydroxypropyl)piperazino | | | | |
| Cl | C₂H₅ | CH₃ | CH₂CH₂CH₂—(N-2 hydroxypropyl)piperazino | Cl | CH₃ | H | CH₂CH₂OCH₃ |
| H | CH₃ | H | CH₂CH₂OCH₃ | CF₃ | CH₃ | H | CH₂CH₂OCH₃ |
| OCH₃ | CH₃ | H | CH₂CH₂OCH₃ | F | n-C₄H₉ | C₂H₅ | CH₂CH₂OCH₃ |
| Cl | n-C₄H₉ | CH₃ | CH₂CH₂OCH₃ | Br | C₂H₅ | H | CH₂CH₂OC₄H₉ |
| H | C₂H₅ | H | CH₂CH₂OC₄H₉ | | | | |
| F | C₂H₅ | H | CH₂CH₂OC₂H₅ | | | | |
| H | CH₃ | H | CH₂CH(OC₂H₅)CH₂CH₃ | | | | |
| Cl | C₂H₅ | CH₃ | CH₂CH₂OC₂H₅ | Cl | n-C₃H₇ | CH₃ | CH₂CH₂OC₂H₅ |
| H | CH₃ | H | CH₂COOCH₃ | F | CH₃ | H | CH₂COOCH₃ |
| OCH₃ | CH₃ | H | CH₂COOCH₃ | H | C₂H₅ | CH₃ | CH₂COOC₂H₅ |
| Cl | C₂H₅ | CH₃ | CH₂COOC₂H₅ | H | CH₃ | H | CH₂COOC₄H₉ |
| H | CH₃ | H | (CH₂)₄COOCH₃ | Cl | CH₃ | H | (CH₂)₄COOCH₃ |
| Cl | C₂H₅ | H | CH₂COOH | OCH₃ | n-C₃H₇ | H | CH₂COOH |
| CH₃ | CH₃ | H | CH₂CONH₂ | Cl | CH₃ | H | CH₂CONH₂ |
| OCH₃ | CH₃ | H | CH₂CONH₂ | F | CH₃ | H | CH₂CONH₂ |
| Cl | CH₃ | H | CH₂CH₂CH₂CONH₂ | H | C₂H₅ | H | CH₂CONCH₃ |
| Cl | CH₃ | C₂H₅ | CH₂CON(CH₃)₂ | F | CH₃ | H | CH₂CON(C₂H₅)₂ |
| H | CH₃ | H | CH₂CH₂CH₂CONHCH₃ | H | CH₃ | H | CH₂CH₂—O—COCH₃ |
| Cl | CH₃ | H | CH₂CH₂—O—COCH₃ | F | CH₃ | H | CH₂CH₂—O—COCH₃ |
| Cl | C₂H₅ | CH₃ | CH₂CH₂—O—COCH₃ | F | CH₃ | CH₃ | CH₂CH₂—O—COC₃H₇ |
| H | CH₃ | H | (CH₂)₄—O—COCH₃ | Cl | C₂H₅ | i-C₃H₇ | (CH₂)₄—O—COCH₃ |
| Br | CH₃ | H | CH₂CH₂—O—COC₂H₅ | H | CH₃ | H | CH₂CH₂—NHCOCH₃ |
| Cl | CH₃ | H | CH₂CH₂—NHCOCH₃ | F | CH₃ | H | CH₂CH₂—NHCOCH₃ |
| OCH₃ | CH₃ | H | CH₂CH₂—NHCOCH₃ | CF₃ | CH₃ | H | CH₂CH₂—NHCOCH₃ |
| Cl | i-C₃H₇ | CH₃ | CH₂CH₂—NHCOCH₃ | H | C₂H₅ | CH₃ | CH₂CH₂—NHCOC₃H₇ |
| CH₃ | CH₃ | CH₃ | (CH₂)₄—NHCOCH₃ | Br | C₂H₅ | n-C₄H₉ | (CH₂)₄—NHCOCH₃ |
| H | CH₃ | H | CH₂CH₂—piperazino | Cl | C₃H₇ | H | CH₂CH₂-piperagino |
| H | C₂H₅ | CH₃ | CH₂CH₂-imidazolidino | F | CH₃ | C₃H₇ | CH₂CH₂-imidazolidino |
| CH₃ | CH₃ | H | CH₂CH₂CH₂-piperazino | | | | |

NOTE.—Where X is other than H, both the 6- and 7-isomers are produced.

EXAMPLE III

N-methyl-3-methylsulfinylmethylquinoxaline-2-carboxamide-1,4-dioxide

Meta-chloroperbenzoic acid (0.507 g., 0.0025 mole) in chloroform (5 ml.) is added dropwise to a stirred solution of N-methyl-3-methylthiomethylquinoxaline-2-carboxamide-1,4-dioxide (0.695 g., 0.0025 mole) in chloroform (35 ml.) at 0° C. The mixture is stored at 0° C. overnight then evaporated to about one-third volume. Ethanol (5 volumes) is added, the mixture let stand for one-half hour then filtered. The product melts at 182°–183° C.

In like manner, the products of Examples I and II are converted to their corresponding sulfinyl derivatives.

EXAMPLE IV

N-methyl-3-methylsulfonylmethyl-2-quinoxaline-carboxamide-1,4-dioxide

To a stirred solution of N-methyl-3-methylthiomethyl-quinoxaline-2-carboxamide-1,4-dioxide (1.0 g.) in chloroform (60 ml.) is added m-chloroperbenzoic acid (2.0 g.). The mixture becomes warm and a precipitate forms. It is stirred overnight at room temperature, then filtered. The product is recrystallized from trifluoroacetic acid/methanol to provide 1.0 g. melting at 245°–246° C. (dec.).

The following compounds are thus prepared:

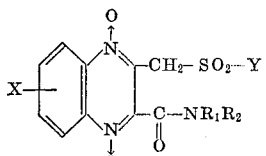

| X | Y | R₁ | R₂ | M.P. (°C.) |
|---|---|---|---|---|
| H | CH₃ | H | H | 239 |
| H | C₂H₅ | H | H | 235–6 |
| H | C₂H₅ | H | CH₃ | 231–1.5 |

In like manner, the products of Examples I and II are converted to their corresponding sulfonyl derivatives.

EXAMPLE V

The 3-loweralkylthiomethyl-, 3-loweralkylsulfinylmethyl- and 3-loweralkylsulfonylmethyl-quinoxaline-2-carboxamide-1,4-dioxides of Examples II through IV wherein R₂ is a lower alkyl group which carries a basic nitrogen atom are converted to acid addition salts by treatment with an equimolar proportion of the appropriate acid in methanol as solvent. The salts are recovered by precipitation with a non-solvent, e.g., ether, hexane or alternatively, if desired, by evaporation of the solvent. The following acid addition salts are thus prepared: p-toluenesulfonate, pamoate, amsonate, 2-hydroxy-3-naphthoate, stearate, citrate, gluconate, benzoate, acetate, propionate, butyrate, sulfate, nitrate, phosphate, hydrobromide, t-butylacetate, trimethylacetate, oxalate, succinate, malate and tartrate.

PREPARATION A 3-bromomethylquinoxaline-2-carboxamide-1,4-dioxide

A mixture of 3-methylquinoxaline-2-carboxamide (2.19 g., 0.01 mole), bromine (3.2 g., 0.04 mole), and glacial acetic acid (30 ml.) is heated on a steam bath for one hour, then cooled to room temperature. The solvent is removed under reduced pressure and the residue triturated in ethanol to give, after filtration, the title compound. It is purified by recrystallization from trifluoroacetic acid-methanol. M.P. 217°–218° C.

By means of this procedure, the 3-bromomethylquinoxaline-2-carboxamide-1,4-dioxide reactants are produced

What is claimed is:

1. A compound of the formula

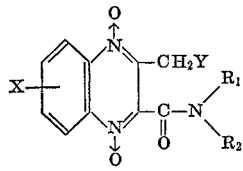

wherein

X is a 6- or 7-position substituent and is selected from the group consisting of hydrogen, methyl, methoxy, chloro, fluoro, bromo and trifluoromethyl;

Y is selected from the group consisting of lower alkylthio, lower alkylsulfinyl and lower alkylsulfonyl;

$R_1$ is selected from the group consisting of hydrogen and lower alkyl;

$R_2$ is selected from the group consisting of hydrogen, lower alkyl and substituted lower alkyl wherein the substituent is selected from the group consisting of (a) amino, mono(lower alkyl)amino, di(lower alkyl)amino, pyrrolidino, piperidino, morpholino, N-(lower alkyl)piperazino, N-hydroxy(lower alkyl)piperazino, N-(lower alkanoyl)piperazino, N-carbo(lower alkoxy)piperazino, pyrrolo, piperazino, imidazolidino, (b) hydroxy, lower alkoxy, carboxy, carbo(lower)alkoxy, carbamyl, mono(lower alkyl)carbamyl, di-(lower alkyl)carbamyl, lower alkanoyloxy, lower alkanoylamino;

and $R_1$ and $R_2$ when taken together with the nitrogen to which they are attached are selected from the group consisting of pyrrolo, pyrrolidino, piperidino, morpholino, thiomorpholino, piperazino, N-(lower alkyl)piperazino, N-hydroxy(lower alkyl)piperazino N-(lower alkanoyl)piperazino and N-carbo(lower alkoxy)piperazino;

and the pharmaceutically-acceptable acid addition salts of those compounds wherein $R_2$ is substituted lower alkyl wherein the substituent is selected from group (a).

2. A compound according to claim 1 having the formula

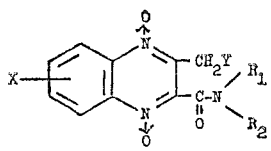

wherein

X is a 6- or a 7-position substituent and is selected from the group consisting of hydrogen, methyl, methoxy, chloro, bromo, fluoro and trifluoromethyl;

Y is lower alkylsulfonyl; and each of $R_1$ and $R_2$ is selected from the group consisting of hydrogen and lower alkyl.

3. A compound according to claim 1 having the formula

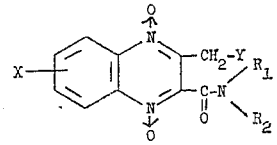

wherein

X is a 6- or a 7-position substituent and is selected from the group consisting of hydrogen, methyl, methoxy, chloro, bromo, fluoro and trifluoromethyl;

Y is lower alkylsulfonyl; and $R_1$ and $R_2$ when taken together with the nitrogen to which they are attached are selected from the group consisting of pyrrolo, pyrrolidino, piperidino, morpholino, thiomorpholino, piperazino, N-(lower alkyl) piperazino, N-(lower alkanoyl)piperazino, N-hydroxy(lower alkyl)piperazino and N-carbo(lower alkoxy)piperazino.

4. A compound according to claim 1 wherein each of X and $R_1$ is hydrogen; Y is lower alkylsulfinyl; and R is lower alkyl.

5. A compound according to claim 1 wherein X is chloro, Y is lower alkylsulfinyl; and each of $R_1$ and $R_2$ is lower alkyl.

6. N - methyl - -3 - methylsulfonylmethyl-6 (or 7)-chloroquinoxaline-2-carboxamide - 1,4-dioxide, a compound according to claim 2 wherein X is chloro; $R_1$ is hydrogen, $R_2$ is methyl and Y is lower alkylsulfonyl.

7. N - [2 - N′-dimethylamino)ethyl] - 3 - methylsulfonylmethylquinoxaline - 2 - carboxamide - 1,4 - dioxide, a compound according to claim 2 wherein each of X and $R_1$ is hydrogen; Y is methylsulfonyl; and $R_2$ is [2-(N,N-dimethylamino)ethyl]-.

8. 3-Ethylsulfonylmethylquinoxaline-2-carboxamide-1,4-dioxide, a compound according to claim 2 wherein each of X, $R_2$ and $R_2$ is hydrogen and Y is ethylsulfonyl.

9. The piperazide of 3-methylsulfonylmethyl-6(or 7)-fluoroquinoxaline-2-carboxylic acid-1,4-dioxide, a compound according to claim 3 wherein X is fluoro; Y is methylsulfonyl; and $R_1$ and $R_2$ taken together are piperazino.

10. N,N-dimethyl-3-methylsulfinylmethylquinoxaline-2-carboxamide-1,4-dioxide, a compound according to claim 4 wherein X is hydrogen; Y is methylsulfinyl; and each of $R_1$ and $R_2$ is methyl.

References Cited

FOREIGN PATENTS 6504563   10/1965   Netherlands _____ 260—250

NICHOLAS S. RIZZO, Primary Examiner

U.S. Cl. X.R.

260—247.5 R, 268, 243 B; 424—250

UNITED STATES PATENT OFFICE
CERTIFICATE OF CORRECTION

Patent No. U. S. 3,644,360     Dated February 22, 1972

Inventor(s) Marwan J. Abuel-Haj

It is certified that error appears in the above-identified patent and that said Letters Patent are hereby corrected as shown below:

column 1, line 59, change "carboamide" to -- carboxamide --.

column 2, line 12, change "pyrrolidine" to -- pyrrolidide --.

column 14, line 13 under heading "$R_2$", change "$CH_2CONCH_3$" to -- $CH_2CONHCH_3$ --.

column 14, line 24 under heading "$R_2$", change "piperagino" to -- piperazino --.

column 16, line 24, change "R" to -- $R_2$ --.

column 16, line 40, change "$R_2$" first occurrence to -- $R_1$ --.

Signed and sealed this 11th day of July 1972.

(SEAL)
Attest:

EDWARD M. FLETCHER, JR.
Attesting Officer

ROBERT GOTTSCHALK
Commissioner of Patents